(12) United States Patent
Natale

(10) Patent No.: US 8,602,834 B2
(45) Date of Patent: Dec. 10, 2013

(54) GAME CALL APPARATUS

(76) Inventor: Nick Natale, Webster, NY (US)

( * ) Notice: Subject to any disclaimer, the term of this patent is extended or adjusted under 35 U.S.C. 154(b) by 174 days.

(21) Appl. No.: 13/353,437

(22) Filed: Jan. 19, 2012

(65) Prior Publication Data

US 2012/0196500 A1    Aug. 2, 2012

Related U.S. Application Data

(60) Provisional application No. 61/437,791, filed on Jan. 31, 2011.

(51) Int. Cl.
*A63H 3/31*    (2006.01)

(52) U.S. Cl.
USPC ........................................................ 446/188

(58) Field of Classification Search
USPC ........................................................ 446/188
See application file for complete search history.

(56) References Cited

U.S. PATENT DOCUMENTS

| | | | |
|---|---|---|---|
| 2,762,164 A * | 9/1956 | Hester | 446/416 |
| 5,803,785 A * | 9/1998 | Primos et al. | 446/207 |
| 6,254,451 B1 * | 7/2001 | Bean | 446/207 |
| 2002/0009946 A1 * | 1/2002 | Primos | 446/207 |

OTHER PUBLICATIONS

Primos, Inc., "The Original Can Estrus", Bleat Model 711, Flora, Mississippi, product information obtained from internet at http://www.gandermountain.com/modperl/product/details.cgi?i=402666&pdesc=Primos_Original_Estrus_Bleat, downloaded from internet Dec. 19, 2011 (total 2 pgs.).

\* cited by examiner

*Primary Examiner* — Michael Dennis
(74) *Attorney, Agent, or Firm* — Peter J. Mikesell; Hiscock & Barclay, LLP

(57) ABSTRACT

Disclosed in this specification is a game call that emits a call for attracting wild game by rotating from an upright position to an inverted position. The game call includes an amplifier having a conic structure with a narrow circular aperture and a wide circular aperture. The narrow circular aperture is connected to the cylindrical top end such that it is within a perimeter defined by the narrow circular aperture.

1 Claim, 4 Drawing Sheets

GAME CALL APPARATUS

CROSS-REFERENCE TO RELATED APPLICATIONS

This application claims priority to and the benefit of co-pending U.S. provisional patent application Ser. No. 61/437,791, filed Jan. 31, 2011, which application is incorporated herein by reference in its entirety.

TECHNICAL FIELD

The present invention relates to a game call apparatus that emits sound for attracting wildlife.

BACKGROUND INFORMATION

Numerous devices are known in the relevant art for use by hunters and others, such as photographers, for producing game sounds intended to be heard by wild game for the purpose of attracting the wild game to the source of the game sound. Such devices are collectively known as game calls and are available in various configurations. Some game calls, for example, are actuated by air and include a reed or other sound-producing member. In order to issue a call, a user must force air into and/or through such an air-actuated game call device. One such device is The Original Can™ Estrus™ Bleat Model No. 711, available from Primos, Inc. of Flora, Miss.

In order to more effectively attract game it is desirable that game calls are configured to produce an attractive sound that will travel an increased distance.

BRIEF DESCRIPTION OF THE DRAWINGS

The present invention is disclosed with reference to the accompanying drawings, wherein.

DETAILED DESCRIPTION

Figure 1:
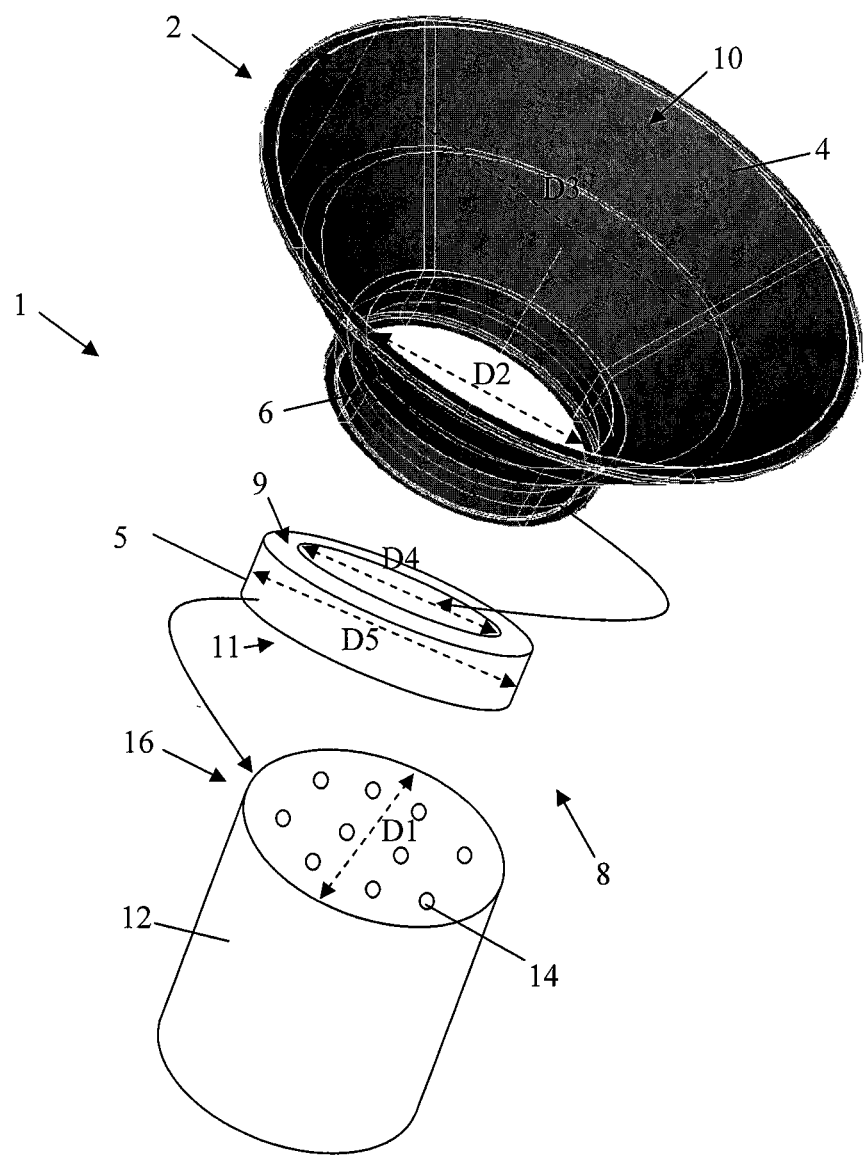
FIG. 1 is a perspective view of a game call apparatus including amplifier according to one exemplary embodiment of the present invention.
Figure 2:
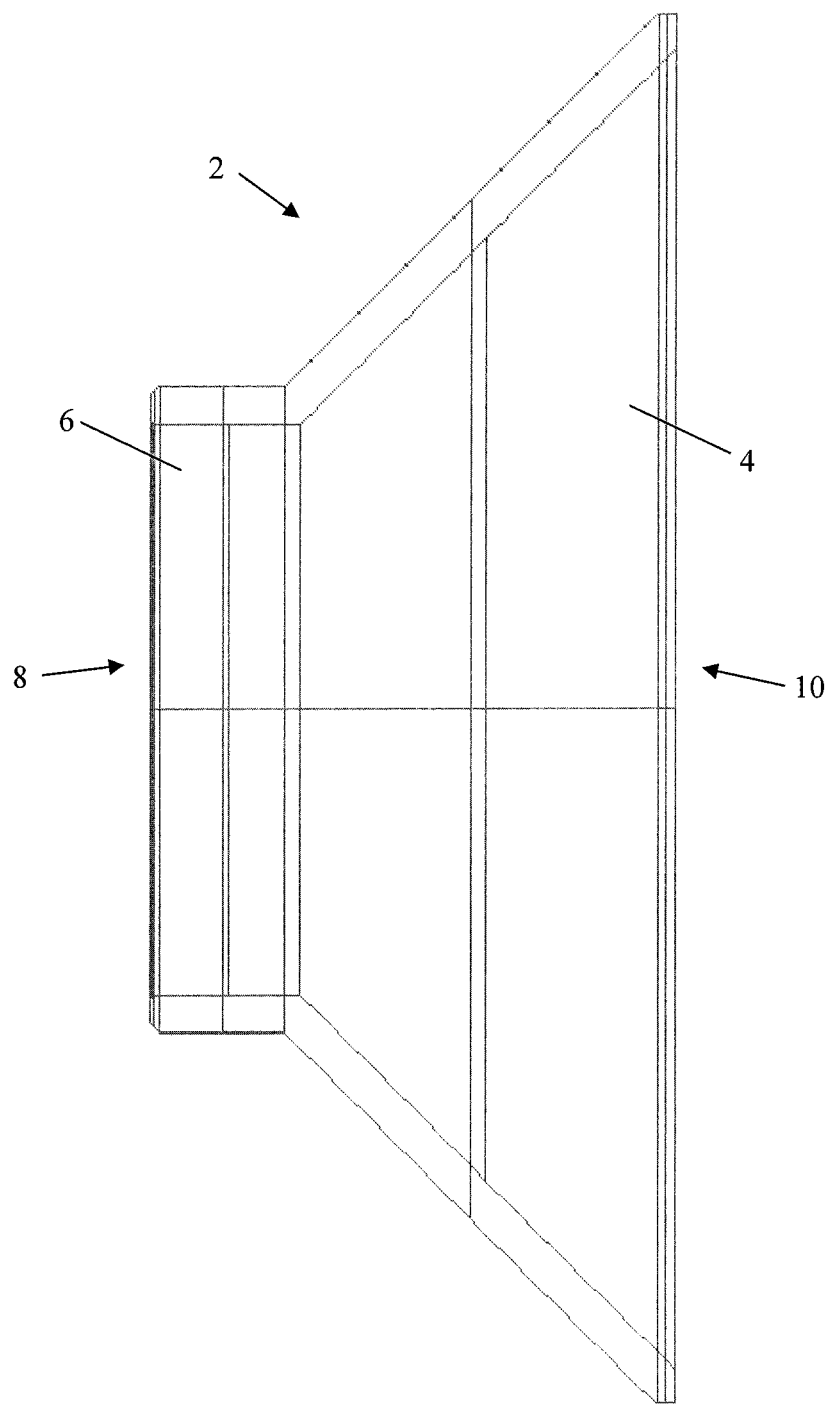
FIG. 2 is a side plan view of a game call amplifier apparatus according to one exemplary embodiment of the present invention.

Referring to FIGS. 1-2, a game call apparatus 1 according to one exemplary embodiment of the present invention is shown as including a game call 12 and an amplifier apparatus 2. The game call 12 can be a cylindrically-shaped bleat-type call for attracting wild game such as deer, for example. The call 12 may include one or more apertures disposed at a bottom end (not shown) and one or more apertures 14 disposed at a top end 16 such that covering the bottom aperture(s) with a thumb or finger and turning the call 12 upside down causes a sound-producing structure to emit an attractive sound from aperture(s) 14.

Because the one or more apertures 14 are disposed substantially in the same plane and are of substantially the same size and diameter, the call 12 is generally configured to emit a sound with a wide range but limited in distance and is thereby less effective for attracting game at far distances. The improved game call apparatus 1 of the present invention includes an amplifier apparatus 2 configured to be disposed proximate the top end of a call 12 at a first end 8. The amplifier apparatus 2 includes a conic structure 4 with an aperture at both first and second ends 8, 10 wherein the aperture at the second end 10 is of a wider diameter D3 than the diameter D2 of the aperture at the first end 8. Accordingly, when disposed proximate the call 12, the amplifier apparatus 2 provides for improved directionality and distance of sound emitted by the call 12 at the aperture(s) 14.

In one exemplary embodiment, the amplifier apparatus 2 can be configured to detachably mount to the call 12 at the first end 8 such as by a collar 6, for example. The collar 6 is an annular structure having, in one exemplary embodiment, a diameter D2 slightly larger than the diameter D1 of the call 12 at the top end 16. The collar 6 can be configured to mount to the call 12 such as by press fit, adhesive, fixing member or any other means of attachment. In another exemplary embodiment, the collar 6 is formed along with the call as an integrated structure.

In yet another exemplary embodiment, an adapter 5 is optionally provided having an open first end 9, having an inner diameter D4 slightly larger than the diameter D2 of the collar 6, and an open second end 11, having an outer diameter D5 slightly larger than the diameter D1 of the top end 16 of the call 12. In this embodiment, the adapter 5 is configured to receive the amplifier apparatus at a first end 9 and the call 12 is configured to receive the adapter 5 at a top end 16. The various components 2, 5, 12 can be retained, if desired, such as by press fit, adhesive, fixing member or any other means of attachment. As call 12 size and diameter D1 vary based on type, volume, and pitch, for example, of the emitted sound, the outer diameter D5 of the adapter 5 can vary along with diameter D1 of the call 12 while the inner diameter D4 of the adapter can remain the same thereby allowing various sized calls 12 to be used with the same amplifier apparatus 2.

Figure 3:
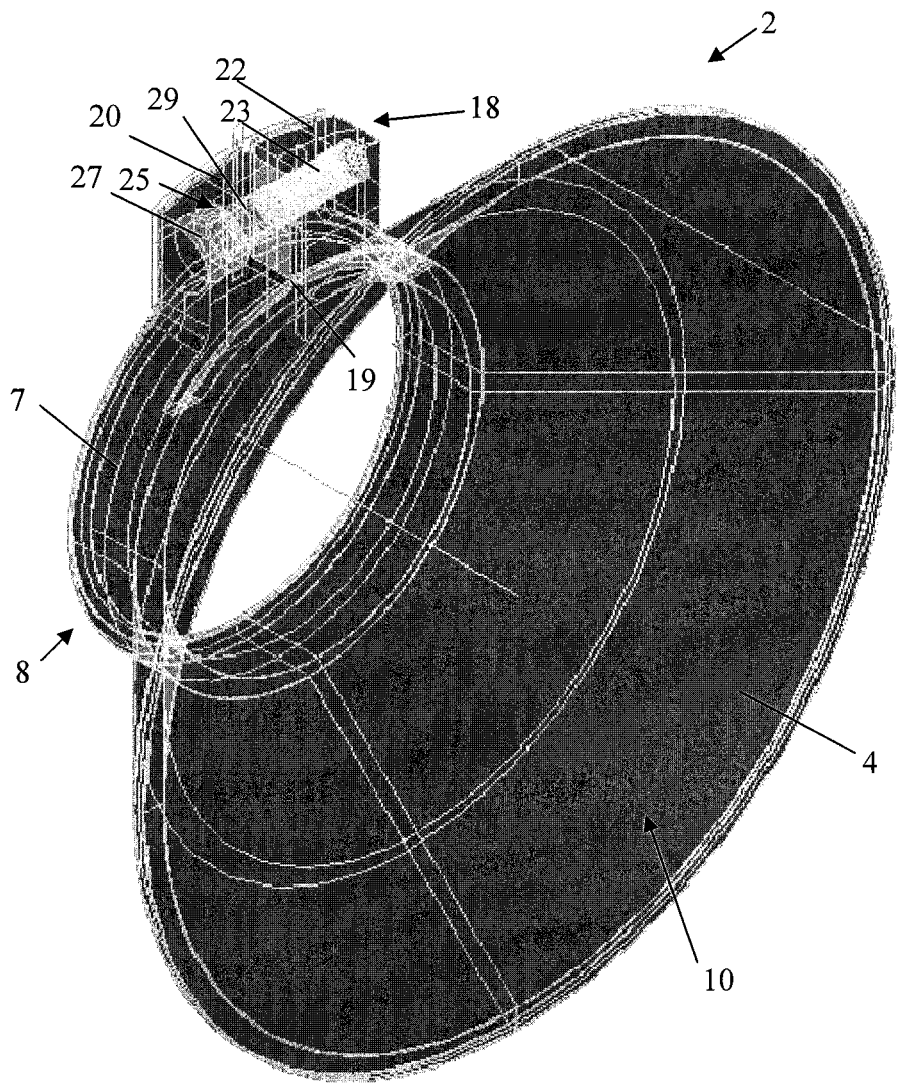
FIG. 3 is a perspective view of a game call amplifier apparatus including compression collar according to one exemplary embodiment of the present invention.
Figure 4:
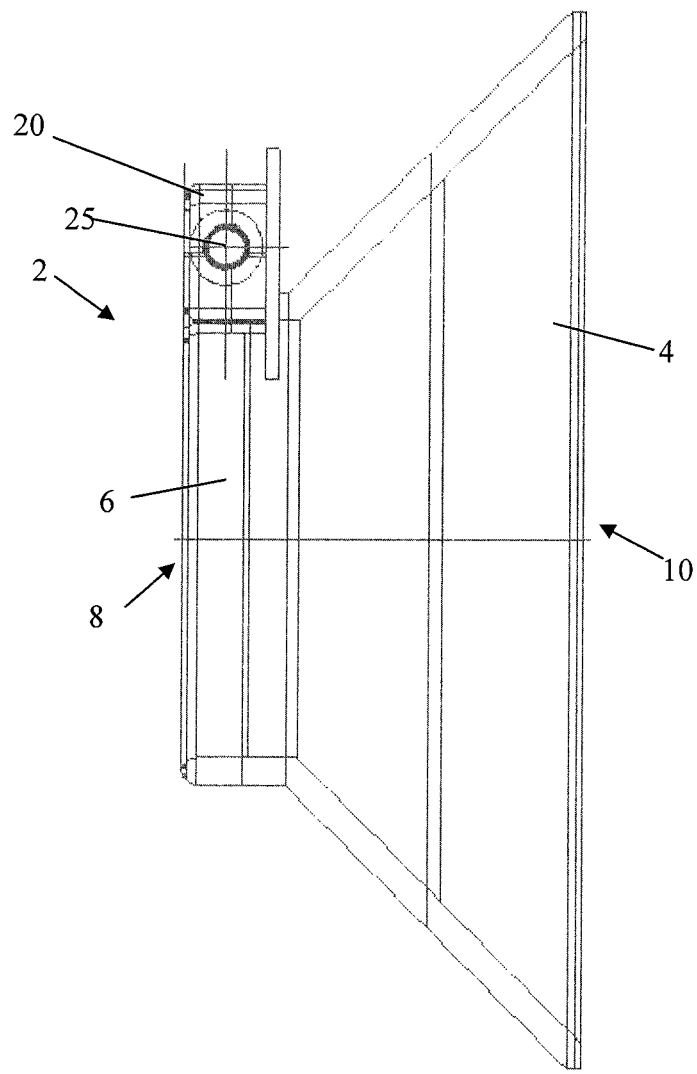
FIG. 4 is a side plan view of a game call amplifier apparatus including compression collar according to one exemplary embodiment of the present invention.

Referring to FIGS. 3-4, in yet another exemplary embodiment, the amplifier apparatus 2 is configured to include a compression collar 7 disposed at a first end 8 for detachably mounting the amplifier apparatus 2 to a call 12. The compression collar 7 is a substantially annular structure including a disjointed portion 19 disposed proximate the clamp portion 18. The clamp portion 18 includes first and second clamp members 20, 22, each disposed on an opposing side of the disjointed portion 19. In one embodiment, at least clamp member 22 includes a threaded aperture 23 for receiving a threaded fastener (not shown). The aperture 23 of claim member 22 is configured to align with an aperture portion 25 of clamp member 20 such that a fastener received by clamp member 20 can extend to and be received by the threaded aperture 23 of clamp member 22 thereby drawing the clamp portion 20 closer to clamp portion 22 so as to reduce the diameter of the collar 6 and detachably mount the collar 6 to a call 12 a top end 16.

In one exemplary embodiment, the aperture 25 includes a first portion 27 of a smaller diameter and a second portion 29 of a larger diameter such that a fastener member having a head portion of a larger diameter and a body portion of a smaller diameter can extend the head portion below the surface of claim portion 20 and abut the first portion 29 of the aperture 25 of a smaller diameter when received by the aperture 25. In another exemplary embodiment, the head of the fastener member abuts the surface of the claim portion 20 when received by threaded aperture 23.

The amplifier apparatus 2 can be made from any suitable material but is preferably made of a material highly reflective of sound waves. In an embodiment including a compression collar 6, the amplifier apparatus 2 is preferably formed of a flexible material such as a thermoplastic, for example.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A game call kit for connecting an amplifier to at least two different game calls, the kit comprising: an amplifier for attaching to a first game call with a first cylindrical top end or a second game call with a second cylindrical top end, the amplifier having a conic structure with a wide circular aperture and a narrow circular aperture; a first adaptor having an first inner diameter that detachably mates with the narrow circular aperture of the amplifier such that a first sound-emitting aperture of the game call is within a perimeter defined by the narrow circular aperture, and a first outer diameter sized to detachably attach to the first cylindrical top end of the first game call; a second adaptor having a second inner diameter that detachably mates with the narrow circular aperture of the amplifier such that a second sound-emitting aperture of the game call is within the perimeter defined by the narrow circular aperture, and a second outer diameter sized to detachably attach to the second cylindrical top end of the second game call, wherein the first and second cylindrical top ends of the first and second game call have different diameters; further comprising the first and second game call, the first and second game call configured to emit a call from the first and second sound-emitting aperture disposed on the first and second cylindrical top end by rotating the first and second game call from an upright position to an inverted position.

\* \* \* \* \*